US007338050B1

(12) United States Patent
Tellez

(10) Patent No.: US 7,338,050 B1
(45) Date of Patent: Mar. 4, 2008

(54) EXPANSION JOINT GASKET

(76) Inventor: Robert R Tellez, 10066 Mozelle La., La Mesa, CA (US) 91941

(*) Notice: Subject to any disclaimer, the term of this patent is extended or adjusted under 35 U.S.C. 154(b) by 236 days.

(21) Appl. No.: 10/874,469

(22) Filed: Jun. 22, 2004

(51) Int. Cl.
*F16L 17/00* (2006.01)

(52) U.S. Cl. ...................... 277/616; 277/626; 277/640; 52/396.05

(58) Field of Classification Search ................ 277/616, 277/617, 626, 644, 640, 906; 52/396.05, 52/396.02, 396.04
See application file for complete search history.

(56) References Cited

U.S. PATENT DOCUMENTS

| | | | | | |
|---|---|---|---|---|---|
| 1,723,306 | A | | 8/1929 | Sipe | |
| 2,016,968 | A | * | 10/1935 | Marble | 52/418 |
| 2,156,681 | A | * | 5/1939 | Dewhirst et al. | 404/65 |
| 2,230,688 | A | * | 2/1941 | Irwin | 404/65 |
| 2,610,713 | A | | 9/1952 | Bradley | |
| 3,166,332 | A | | 1/1965 | Olson | |
| 3,213,584 | A | * | 10/1965 | Bush | 277/649 |
| 3,378,958 | A | * | 4/1968 | Parks et al. | 49/489.1 |
| 3,508,369 | A | * | 4/1970 | Tennison | 52/396.08 |
| 3,520,544 | A | | 7/1970 | Taylor | |
| 3,604,169 | A | * | 9/1971 | Smith | 52/396.04 |
| 3,727,926 | A | | 4/1973 | Berry | |
| 3,760,544 | A | * | 9/1973 | Hawes et al. | 52/468 |
| D236,718 | S | * | 9/1975 | Patterson | D25/121 |
| 3,923,411 | A | * | 12/1975 | Berghman | 404/64 |
| 4,388,016 | A | | 6/1983 | Levey | |
| 4,615,161 | A | | 10/1986 | Mileham | |
| 4,815,886 | A | * | 3/1989 | Madsen | 403/28 |
| 5,181,341 | A | | 1/1993 | Keys et al. | |
| 5,440,847 | A | | 8/1995 | Butler | |
| 5,531,455 | A | * | 7/1996 | Calixto | 277/646 |
| 5,575,126 | A | * | 11/1996 | Attaway et al. | 52/396.02 |
| 5,628,857 | A | | 5/1997 | Baerveldt | |
| 5,826,378 | A | | 10/1998 | Gallas | |
| 5,888,017 | A | * | 3/1999 | Corrie | 404/64 |
| 6,219,982 | B1 | * | 4/2001 | Eyring | 52/396.04 |
| 6,474,654 | B1 | * | 11/2002 | Schmeichel | 277/630 |
| 6,491,468 | B1 | * | 12/2002 | Hagen | 403/291 |
| 6,751,919 | B2 | * | 6/2004 | Calixto | 52/573.1 |
| 6,991,400 | B1 | * | 1/2006 | Negueloua | 404/56 |

FOREIGN PATENT DOCUMENTS

| | | |
|---|---|---|
| DE | 3142690 | 5/1983 |
| GB | 498992 | 1/1939 |

* cited by examiner

*Primary Examiner*—William L. Miller
(74) *Attorney, Agent, or Firm*—Michael I. Kroll

(57) ABSTRACT

An expansion gasket 10 positionable between similar or dissimilar materials having an exterior exposure to the elements. In the preferred embodiment, the expansion gasket of the present invention 10 provides means to seal a space occurring between mated articles such as walls and windows, doors, electrical outlets, lighting fixtures, fans, ventilation grille, etc. The gasket 10 may have one or two bases 60, 62 and various shapes including 52, 54.

8 Claims, 18 Drawing Sheets

EXPANSION JOINT GASKET

BACKGROUND OF THE INVENTION

Field of the Invention

The present invention relates generally to seals and, more specifically, to an expansion joint gasket positionable between similar or dissimilar materials having an exterior exposure to the elements. In the preferred embodiment, the expansion joint gasket of the present invention provides means to seal a space occurring between mated articles such as walls and windows, doors, electrical outlets, lighting fixtures, fans, ventilation grille, etc.

Currently, it is the custom, especially in new construction, to seal spaces between walls and articles placed in walls with expandable foams or other forms of insulation, which for the short term fulfill their intended purpose. But, since these material are affected differently by temperature and age, spaces between these article tend to occur over time, especially materials having a water content such as, wood, stucco and concrete. Over time these material have a tendency to shrink, thereby causing spaces to occur between mating surfaces and failure of the sealant therebetween. Once failure occurs structural integrity empirically disintegrates as water seeps through to the underlayment. Particularly in areas where the temperature drops to a point where the water freezes accelerating material failure.

The present invention overcomes the shortcomings of the prior art by providing an elastomeric member positioned between the mating articles that will expand and contract as the void between the articles changes due to the forces acting upon the materials such as, temperature and age.

The present invention is embodied by compressing the elastomeric member in the void during installation, which will allow for expansion and contraction of the elastomeric member during the life of the structure.

Also provided for by the present invention is adhesively bonding the elastomeric member to each of the mating articles, which also seals the void during expansion and contraction during the life of the structure.

Furthermore, the present invention provides for embedding or impressing part of the elastomeric member into a curing substance, such as concrete and stucco whereby one end of the elastomeric member becomes anchored into the material as it cures. The other end would engage the opposing article with or without adhesively bonding it thereto.

The present invention provides an elastomeric member that will expand and contract, forming an expansion joint gasket between mating articles, comprising a first article engaging member and a second article engaging member spaced from each other having an expandable contractible portion positioned therebetween.

DESCRIPTION OF THE PRIOR ART

There are other sealing devices designed for mating articles. Typical of these is U.S. Pat. No. 1,723,306 issued to Sipe on Aug. 6, 1929.

Another patent was issued to Bradley on Sep. 16, 1952 as U.S. Pat. No. 2,610,713. Yet another U.S. Pat. No. 3,166,332 was issued to Olson on Jan. 19, 1965 and still yet another was issued on Jul. 14, 1970 to Taylor as U.S. Pat. No. 3,520,544.

Another patent was issued to Berry on Apr. 17, 1973 as U.S. Pat. No. 3,727,926. Yet another U.S. Pat. No. 4,388,016 was issued to Levey on Jun. 14, 1983. Another was issued to Mileham on Oct. 7, 1986 as U.S. Pat. No. 4,615,161 and still yet another was issued on Jan. 26, 1993 to Keys, et al. as U.S. Pat. No. 5,181,341.

Another patent was issued to Butler on Aug. 15, 1995 as U.S. Pat. No. 5,440,847. Yet another U.S. Pat. No. 5,628,857 was issued to Baerveldt on May 13, 1997. Another was issued to Gallas on Oct. 27, 1998 as U.S. Pat. No. 5,826,378. Another German patent DE3142690 was issued to Herbert Borkhoff on May 19, 1983 and still yet another was issued on Jan. 17, 1939 to Newton as United Kingdom Patent No. GB 498,992.

U.S. Pat. No. 1,723,306

Inventor: Harry E. Sipe

Issued: Aug. 6, 1929

A coupling of the class described comprising an elongated strip of resilient material, and means disposed at the opposite sides of said strip in connection with which the members to be coupled together thereby are adapted to operate for coupling said members together, and means for reinforcing that part of, the strip bridging said members.

U.S. Pat. No. 2,610,713

Inventor: Stephen D. Bradley

Issued: Sep. 16, 1952

A coupling of the class described comprising an elongated strip of resilient material, and means disposed at the opposite sides of said strip in connection with which the members to be coupled together thereby are adapted to operate for coupling said members together, and means for reinforcing that part of, the strip bridging said members.

U.S. Pat. No. 3,166,332

Inventor: Richard L. Olson

Issued: Jan. 19, 1965

A pressure assembly comprising a pair of separable substantially rigid members with opposed parting faces providing a parting joint about a cavity to be substantially sealed against a fluid pressure differential, one of said members having in its parting face an elongated recess opening therefrom toward the opposing parting face, a strip of elastomeric material having substantially, separate, independently acting, small, generally bubble-like gas cells having flexible interconnected walls of the elastomeric material, said strip having a main portion sealingly engaged in and initially filling said recess, said strip having an initially outwardly projecting rib portion containing said bubble-like gas cells which extend approximately to an outer surface so that said gas cells may be compressed and conformed to the parting face of the other member and to any irregularities thereon, and said rib portion being compressibly displaced by said parting face of said other member entirely into the initial volume of said main portion by the elastic volume reduction of said gas cells in said main portion.

U.S. Pat. No. 3,520,544

Inventor: Dudley D. Taylor

Issued: Jul. 14, 1970

In combination with a pair of adjustable compression members which define a cavity in which high pressures are encountered, a sealing ring comprising a one-piece sealing ring of approximate Y-shape in radial section and having a stem and arms extending inwardly from the stem, said stem of the Y comprising a 180° bend and two spaced parallel portions contacting each other at their inner ends and providing a first cavity, each arm of the Y being convex outwardly and concave inwardly; each of said arms projecting inwardly from each of said parallel portions and joining said respective parallel portions at an obtuse angle with respect to the exterior face of said sealing ring, said arms being in opposed facing relationship to each other, the space between the two arms of the Y being clear, said arms terminating respectively at spaced apart tips such that planes tangent to said tips intersect to form an angle significantly less than 180° and forming a second cavity, said adjustable members compressing said seal and creating an internal line contact in said seal.

U.S. Pat. No. 3,727,926

Inventor: Jean-Luc Berry

Issued: Apr. 17, 1973

The invention relates to a sealed joint comprising a first and a second member between which is formed a substantially L-shaped cross-sectional recess in, which is placed a gasket which has a corresponding L-shaped cross-sectional section. The gasket and the recess are so formed that a continuous and excellent sealing is provided between the two members and the gasket, and that no excessive compression or deformation of the gasket is to be feared.

U.S. Pat. No. 4,388,016

Inventor: Bertram J. Levey

Issued: Jun. 14, 1983

This invention relates to a novel and improved expansion joint and seal for use in sealing concrete expansion joints. In general the device is constituted of an elongate flexible seal member inclusive of an expandable loop portion from the non-closed sides of which a pair of alternately disposed downwardly projected leg portions is extended. The device also includes a pair of elongate side frames, each of which is attached to an alternately disposed downwardly projected leg portion of said elongate flexible seal member, and a removable, elongate top cap for affixing upon the loop portion of said elongate flexible seal member. The improvement relates to, inter alia, in said member, side frames which contain one or more pairs of inwardly sloped laterally aligned ribs which form longitudinal channels with relatively wide bottom surfaces with restricted surface outlets, the channel forming a means of tenaciously bonding plastic cement to said side frames to form a flexible seal. The side frames also include upwardly faced deep U-shaped slots within which each of the leg portions of said expandable loop portion of the elongate flexible seal is extended, and bonded by use of adhesive.

U.S. Pat. No. 4,615,161

Inventor: Glen B. Mileham

Issued: Oct. 7, 1986

An expansion joint for a structure such as a bridge or roadway comprising a pair of elongate tubes 14, 16 each having a longitudinal slot 24, 26 and a relatively wider channel 32, 34 and a folded strip 22 of polymeric material. The tubes 14, 16 are fixed to the structure by means of anchors 18, 20. The strip has bulbous edge portions 36, 38 which are located in the channels 32, 34. The strip 22 and tubes 14, 16 are located below the level of the structure surface.

U.S. Pat. No. 5,181,341

Inventor: James F. Keys

Issued: Jan. 26, 1993

A variable gap sealing article for sealing between a first surface and a second surface has an elongated body portion with a resilient contractible portion and an expandable portion. The article fills a gap between the surfaces by expanding the expandable portion and compressing the contractible portion.

U.S. Pat. No. 5,440,847

Inventor: Sandra L. Butler

Issued: Aug. 15, 1995

A molded exterior decorative unit for securement to a structural facing comprises a molded unit with front and back surfaces and side edges. The front surface has decorative features, while a channel is molded in the back surface into which a compressible, expandable, flexible sealing member is partially secured. Preferably, a groove is formed in the floor of the channel so as to provide a labyrinth path for air or moisture. Upon securement of the molded decorative unit to a facing, the compressible, expandable, flexible sealing member forms a seal adjacent the periphery of the molded unit. In one embodiment, weep holes or slots are provided at the back adjacent a bottom surface of the molded exterior decorative unit. In another embodiment, where the unit is adapted for securement in a recess in the structural facing, the channel is formed in the side edge of the molded unit, and the compressible, expandable, flexible sealing member forms a seal between the side edge and a surrounding wall forming the recess.

U.S. Pat. No. 5,628,857

Inventor: Konrad Baerveldt

Issued: May 13, 1997

A method of manufacturing a retaining element for an expansion joint seal comprises co-extruding, in a desired profile, a thermoplastic rubber body with high density thermoplastic elastomer reinforcing plate on the lower surface thereof. The reinforcing plate includes at least one rib extending into the thermoplastic rubber body. After the co-extruded body and reinforcing plate are permitted to cool and harden the lower surface of said co-extruded body and reinforcing plate is mechanically planed to obtain a retaining element of said desired profile with a flat lower surface.

U.S. Pat. No. 5.826.378

Inventor: Gerard Gallas

Issued: Oct. 27, 1998

A sealing strip for sealing between a flange defining the door opening, such as in a motor vehicle body, and the door of the opening, comprises a channel-shaped gripping part for gripping the flange and supporting a hollow tubular sealing part, preferably made of sponge rubber. The latter is partially compressed between the flange and the closing door so as to provide a barrier against ingress of moisture and draft. In order to provide improved blocking of acoustic energy, so as to reduce the amount of exterior noise (road noise, aerodynamic noise) transmitted into the interior of the vehicle, the hollow tubular sealing part supports a metal wire running lengthwise along and within the hollow tube and supported from the tubular side wall so as to be capable of vibrating in a transverse direction. The mass of the wire and the rigidity with which it is supported are such that the resonant frequency with which the wire vibrates is less than a frequency band of acoustic energy to be attenuated, whereby the additional material tends to vibrate in opposition to, and thus attenuates, acoustic energy within that frequency band.

German Patent Number DE3 142690

Inventor: Herbert Borkhoff

Issued: May 19, 1983

In this plastic/aluminum compound construction, the outer aluminum profiles are screwed non-displaceably from the rebate groove to the inner plastic profiles and form a joint statical unit with sufficient cross-sectional strength without the additionally insertable reinforcements. Furthermore, the differing expansion of the two materials due to plastic profile compression effects between the intervals of the attachment screws is counteracted in a controlled manner. Moreover, any desired glass groove widths can be manufactured in the outer and wing frame by displacing the screwing-on surfaces infinitely variably. The aluminum profiles screwed on from the wing rebate groove allow the glass to be inserted and removed without wing glass strips, as a result of which a closed profile unit is achieved on the inside of the wing plastic profiles. One possible embodiment of this plastic/aluminum compound construction is illustrated in the drawing, sheet.

United Kingdom Patent Number GB 498,992

Inventor: James Thomas Newton

Issued: Jan. 17, 1939

An inflatable tube adapted to be inserted in a recess in the frames or in the edges of doors, windows and the like of buildings or vehicles to exclude gas or other atmospheric pollution comprises lengths of rubber tubing jointed to corner pieces of molded rubber and provided with a tubular connection and a valve for inflation. The walls of the tube and corner piece are tapered at the ends and vulcanized one within the other and the wall of the corner piece may be of reduced thickness to facilitate uniform expansion. The tube may be of oval or D-section and a recess may be formed in the sash to be engaged by it when expanded. The tube may be secured on the channel by adhesive with or without an attached fabric strip. The invention may be applied to partitions built up of sections or to steel shutters with or without toughened glass panels for protection against bomb splinters. A hollow sheet metal mandril may be used within the tube at the joint when vulcanizing. When applied to metal windows the bottom of the frame may be rounded or a rounded metal or rubber liner may be inserted in the channel, FIG. 4. To seal a house against gas etc., the letter-box, air-bricks, chimney ventilators, trap-doors etc. are closed according to the invention. The channels may be partially covered with flexible material overlying the tubing.

While these gasket-like devices may be suitable for the purposes for which they were designed, they would not be as suitable for the purposes of the present invention, as hereinafter described.

SUMMARY OF THE PRESENT INVENTION

The present invention discloses an expansion gasket positionable between similar or dissimilar materials having an exterior exposure to the elements. In the preferred embodiment, the expansion gasket of the present invention provides means to seal a space occurring between mated articles such as walls and windows, doors, electrical outlets, lighting fixtures, fans, ventilation grille, etc. The gasket may have one or two bases and various shapes.

A primary object of the present invention is to provide means for mating articles comprising an expandable contractible member positioned therebetween.

Another object of the present invention is to provide an expandable contractible member between mating articles that will maintain contact with the articles as they expand and contract according to the material properties of the articles.

Yet another object of the present invention is to provide an expandable contractible member that will prevent the passage of substances through the void between mating articles having said member positioned therebetween.

Still yet another object of the present invention is to provide an expandable contractible member having elastomeric properties.

Another object of the present invention is to provide an expandable contractible member that can be compressed and positioned within the void between mating articles engaging said articles.

Yet another object of the present invention is to provide an expandable contractible member that can be adhesively bonded between mating articles fixedly engaging said articles.

Still yet another object of the present invention is to provide an expandable contractible member having a first article engaging member and a second article engaging member with a body positioned therebetween.

Another object of the present invention is to provide an expandable contractible member wherein one of the article engaging members can be embedded or impressed into a curing substance.

Yet another object of the present invention is to provide an expandable contractible member wherein said embedded member incorporates retaining means for said positioning.

Additional objects of the present invention will appear as the description proceeds.

The present invention overcomes the shortcomings of the prior art by providing an expansion gasket positionable between similar or dissimilar materials having an exterior exposure to the elements. The expansion gasket provides means to seal a space occurring between mated articles such as walls and windows, doors, electrical outlets, lighting fixtures, fans, ventilation grille, and other building construction penetrations of exterior walls etc. due to the forces acting upon the materials such as, temperature and age.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
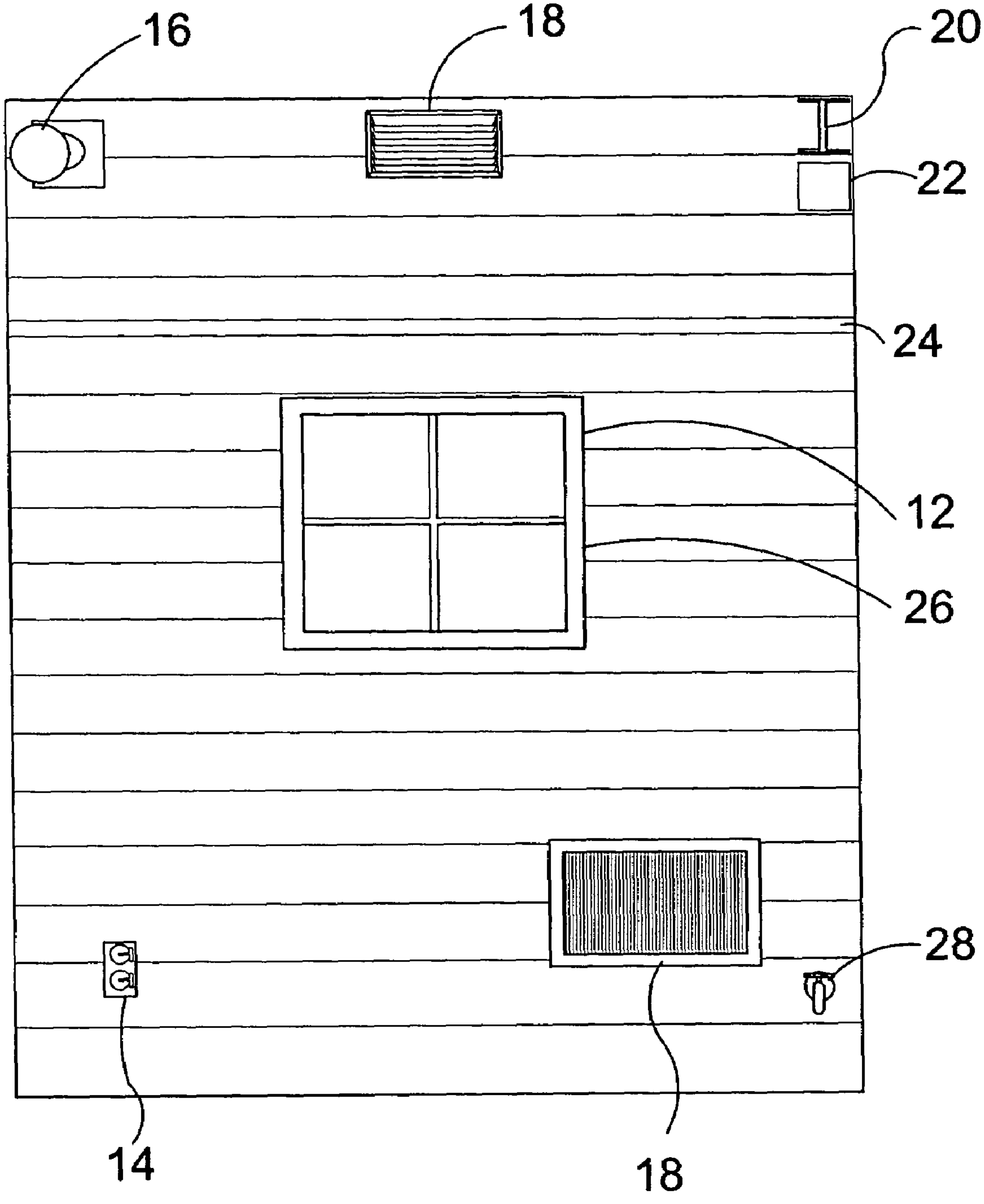
FIG. 1 is an illustrative view of some uses of the expansion joint gaskets of the present invention.

With regard to reference numerals used, the following numbering is used throughout the drawings.

10 present invention
12 windows
14 electrical outlets
16 light fixture
18 air vents
20 I-beam
22 wood beam
24 metal trim
26 wood trim
28 plumbing fixture
30 void
32 stucco
34 two×four
36 metal lathing
38 flashing
40 paper
42 adhesive
44 metal reglet
46 metal trim
48 elastomer
50 substantially dried wall
52 I-beam
54 "D"
56 double leg
58 flanges
60 first base
62 second base
64 receptacle

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to appended claims.

Turning to FIG. 1, shown therein is an illustrative view of some uses of the expansion joint gaskets of the present invention. The present invention is an expansion joint gasket positionable between similar or dissimilar materials having an exterior exposure to the elements. The expansion joint gasket provides means to seal a space occurring between mated articles such as walls and windows 12, doors, electrical outlets 14, lighting fixtures 16, fans, ventilation grille for air vents 18 for a louver and air conditioning, steel I-beam 20, wood beam 22, metal trim 24, wood trim 26, plumbing fixture 28, and other building construction penetrations of exterior walls etc., where forces acting upon the materials such as, water, temperature and age cause the void between the article to increase and/or decrease.

Figure 2:
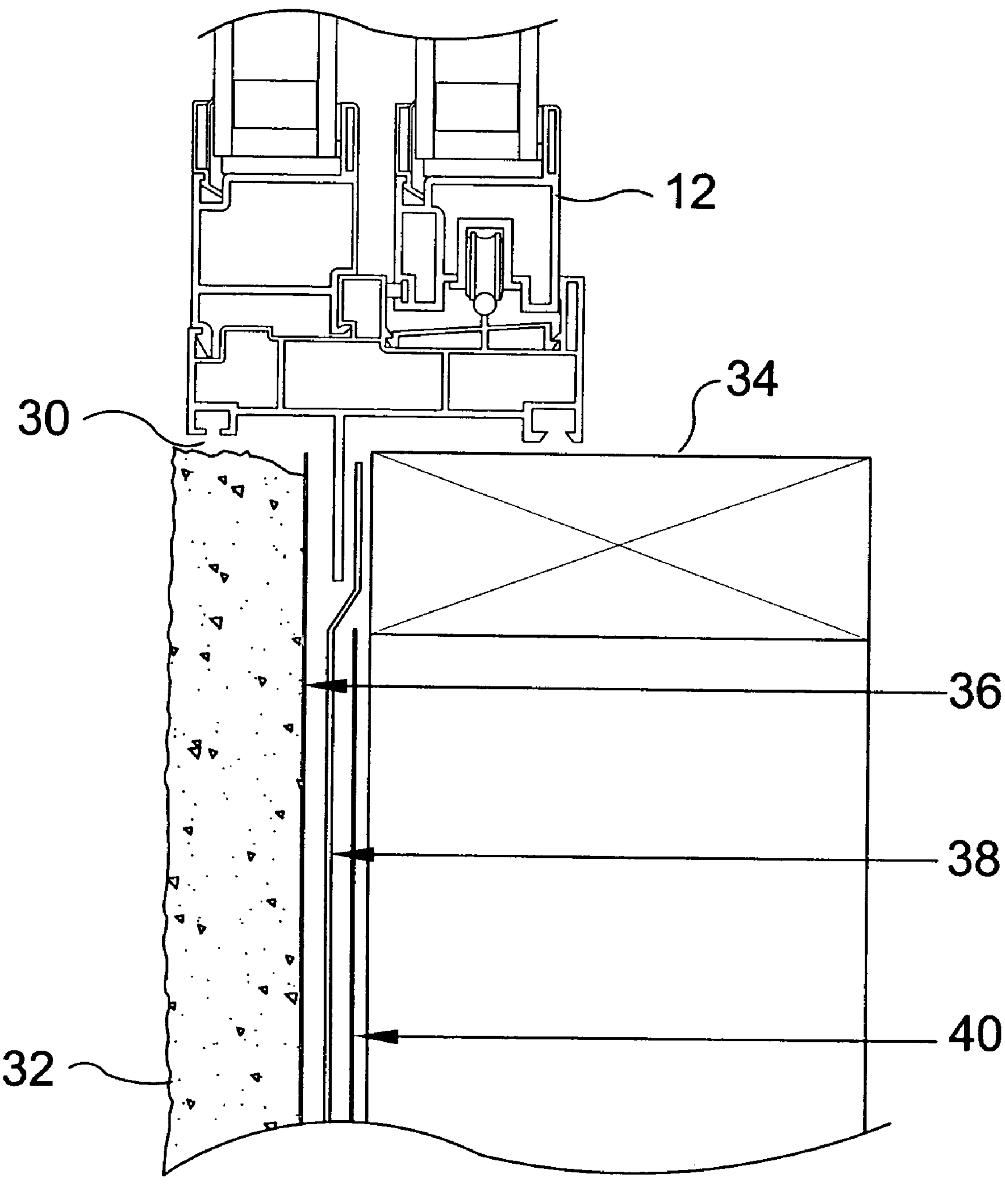
FIG. 2 (PRIOR ART)
FIG. 2 is a sectional view of an area of water intrusion of the prior art.

Turning to FIG. 2, shown therein is a sectional view of an area of water intrusion of the prior art. Shown is an illustrative view of a void 30 that can occur between mated articles by forces acting upon the materials such as, water, temperature and age causing the void between the articles to increase and/or decrease over time. Such article includes voids 30 between walls and windows 12, doors, electrical outlets, lighting fixtures, fans, ventilation grille, etc. Also shown is stucco 32 or plaster, a two×four 34, metal lathing 36, window flashing 38 and building paper 40 or weather resistive barrier.

Figure 3:
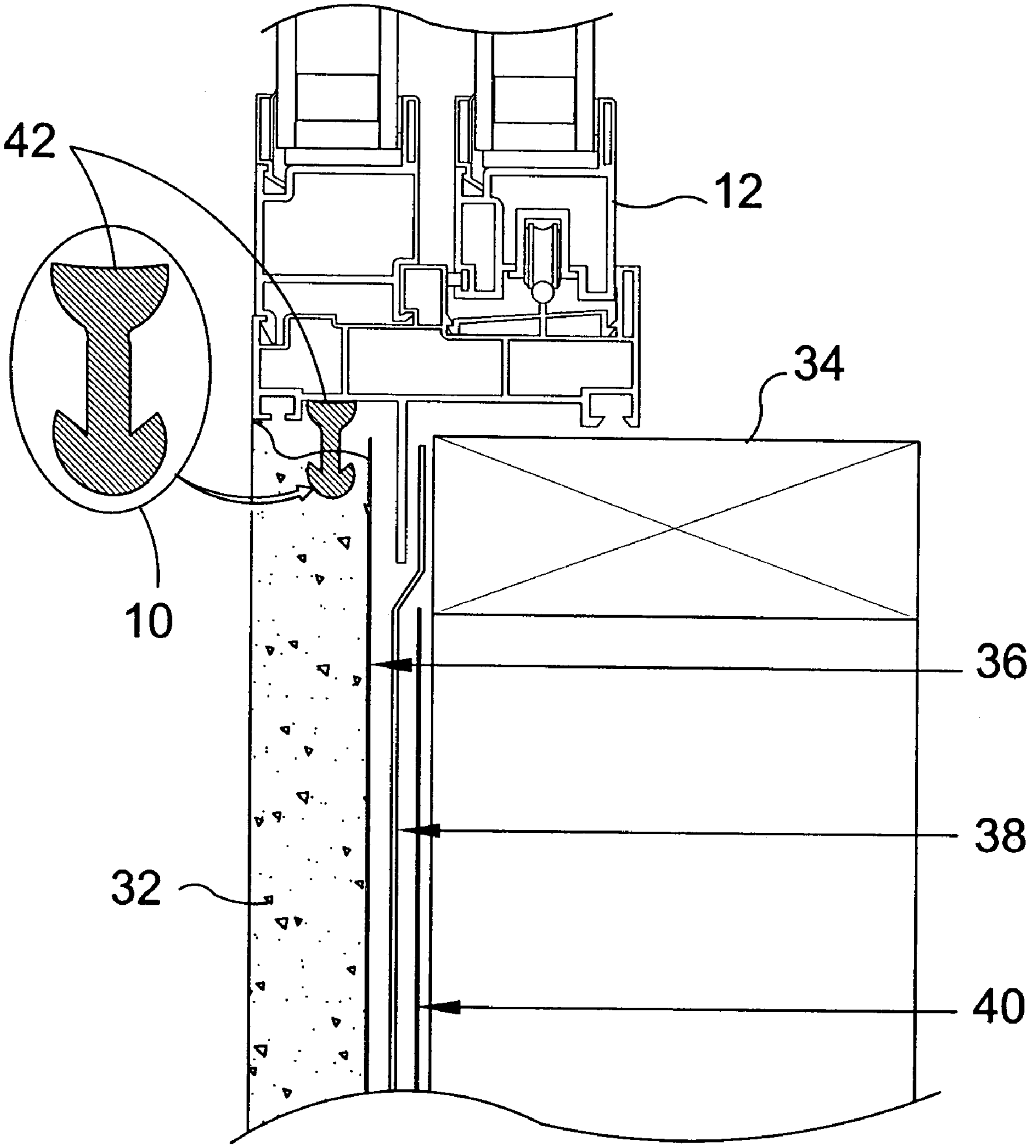
FIG. 3 is a sectional view of the installation of the present invention.

Turning to FIG. 3, shown therein is a sectional view of the installation of the present invention 10. Illustrated is an expansion joint member of the present invention 10 positioned between adjacent surfaces 12, 32. The elastomeric member 10 will expand and contract, forming an expansion gasket between mating articles, comprising a first article engaging element and a second article engaging element spaced from each other having an expandable contractible portion positioned therebetween. The present invention 10 provides for embedding or impressing part of the elastomeric member into a curing substance, such as concrete, plaster, stucco 32, etc., whereby one end of the elastomeric member becomes anchored into the material as it cures. The other end would engage the opposing article with adhesive 42 or without adhesively bonding it thereto. The adhesive 42 may be used for attachment to window 12. Other previously disclosed elements are also shown.

Figure 4:
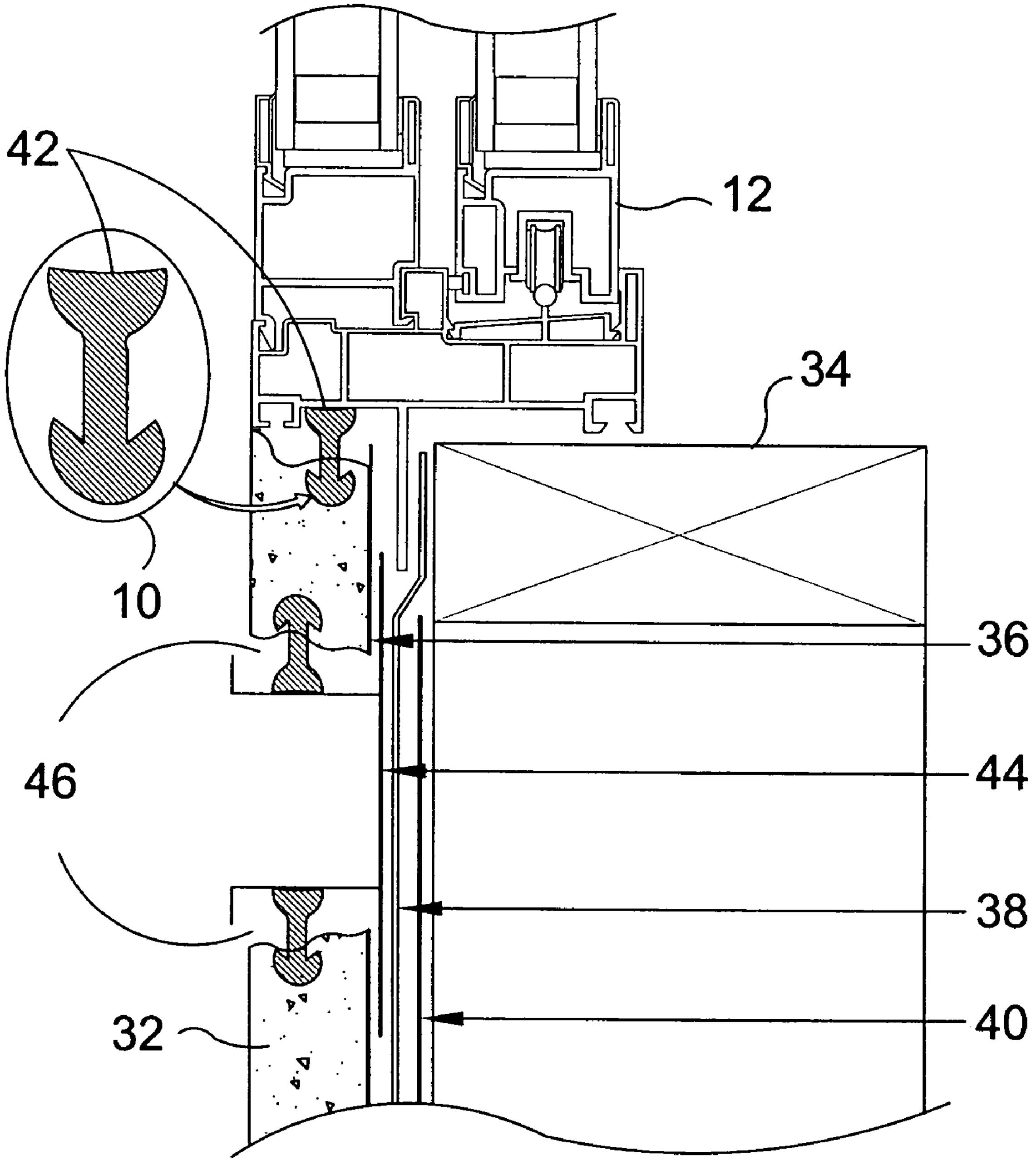
FIG. 4 is a sectional view of the installation of the present invention.

Turning to FIG. 4, shown therein is a sectional view of the installation of the present invention 10. Illustrated is an expansion joint member of the present invention 10 positioned on opposing sides of a metal reglet 44, which allows for 100% expansion between dissimilar materials during temperature changes and age construction. The elastomeric member will expand and contract, forming an expansion gasket between mating articles 12, 32, comprising a first article engaging element and a second article engaging element spaced from each other having an expandable contractible portion positioned therebetween. The present invention 10 provides for embedding or impressing part of the elastomeric member into a curing substance, such as concrete, plaster, stucco 32, etc., whereby one end of the elastomeric member becomes anchored into the material as it cures. The other end would engage the opposing article with adhesive 42 or without adhesively bonding it thereto. Also shown is metal trim 46 with an expansion joint 10 at the common joint gap. Other previously disclosed elements are also shown.

Figure 5:
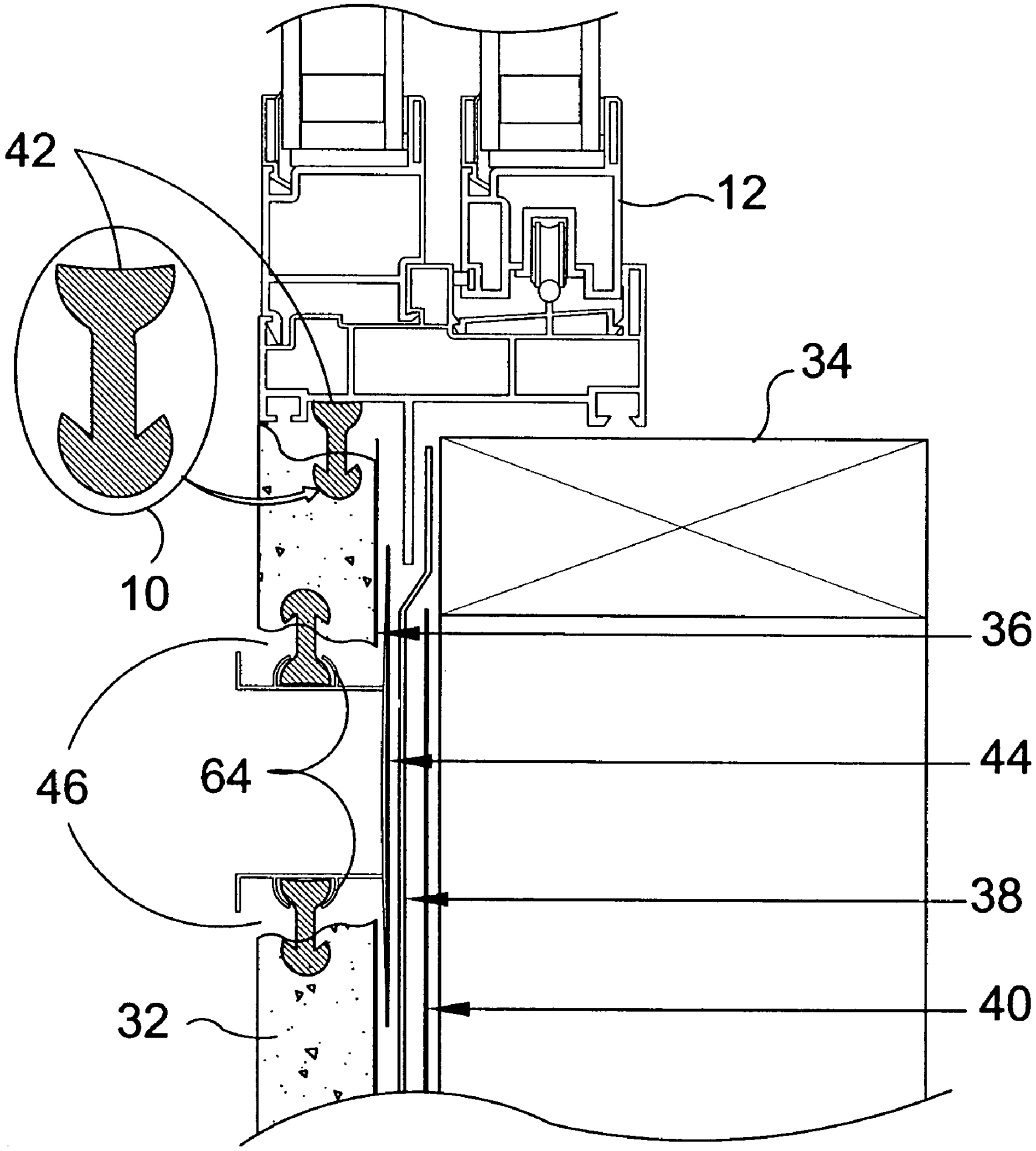
FIG. 5 is a sectional view of the installation of the present invention.

Turning to FIG. 5, shown therein is a sectional view of the installation of the present invention 10. Illustrated is an expansion joint member of the present invention 10 positioned on opposing sides of a metal reglet 44, which allows for 100% expansion between dissimilar materials during temperature changes and age construction. The elastomeric member will expand and contract, forming an expansion gasket between mating articles 12, 32, comprising a first article engaging element and a second article engaging element spaced from each other having an expandable contractible portion positioned therebetween. The present invention 10 provides for embedding or impressing part of the elastomeric member into a curing substance, such as concrete, plaster, stucco 32, etc., whereby one end of the elastomeric member becomes anchored into the material as it cures. The other end would engage the opposing article with adhesive 42 or without adhesively bonding it thereto. Also shown is metal trim 46 with an expansion joint 10 at the common joint gap. Also shown is a receptacle 64 within which the base of the expansion joint member 10 is mounted; in this embodiment the receptacle 64 is disposed on the metal trim. Other previously disclosed elements are also shown.

Figure 6:
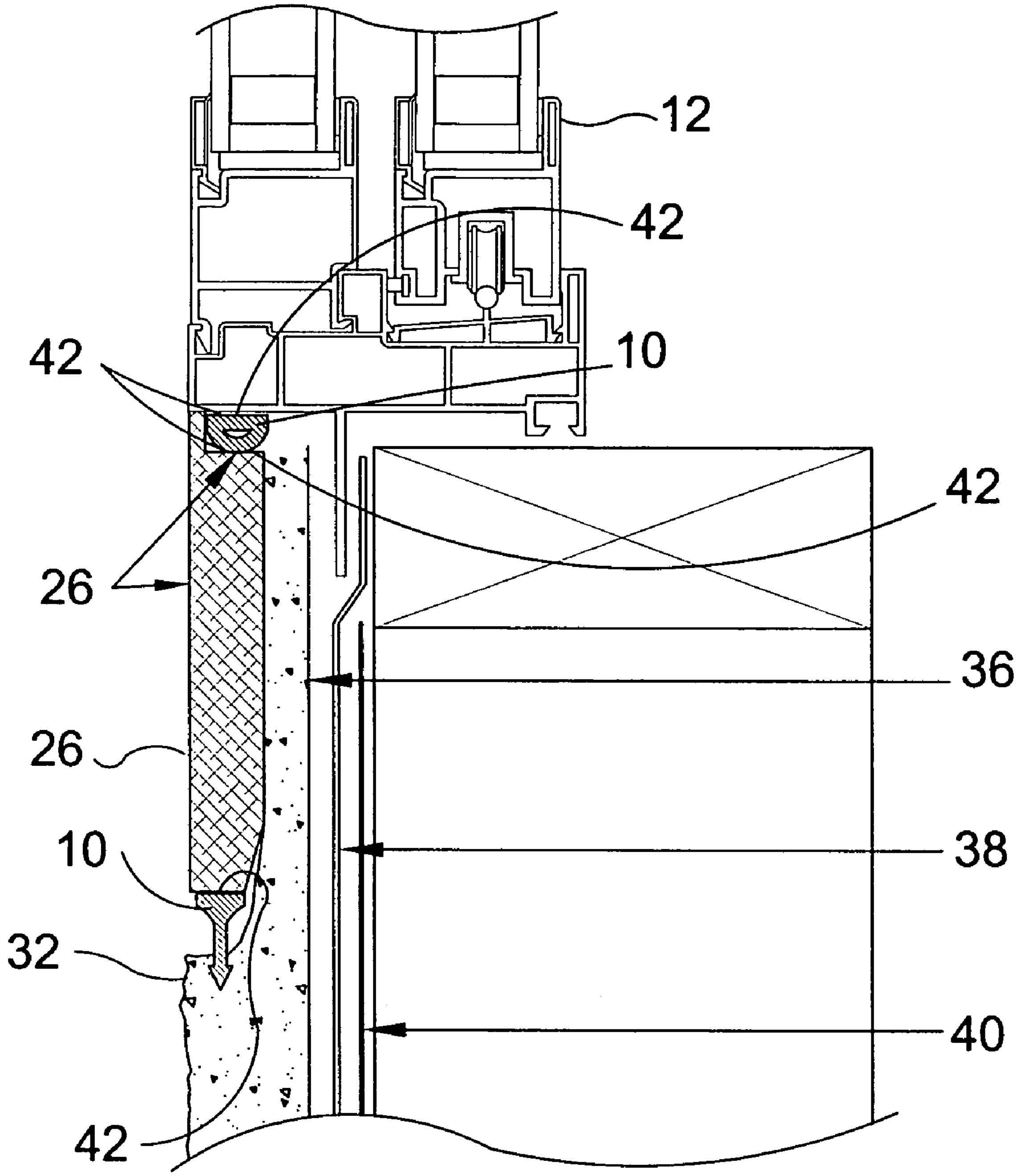
FIG. 6 is a sectional view of the present invention in use.

Turning to FIG. 6, shown therein is a sectional view of the present invention 10 in use. Illustrated are "D" shaped expansion joint members 10 positioned between adjacent articles. The elastomeric member 10 will expand and contract, forming an expansion joint gasket between mating articles. The present invention 10 provides for either positioning the gasket between articles with gasket surfaces engaging opposing article surfaces, whereby the gasket will expand and contract as the void between the articles changes or one element of the gasket is embedded or impressed into a curing substance, such as concrete, plaster, stucco 32, etc., whereby one end of the elastomeric member becomes anchored into the material as it cures. The function of both variations of the gasket 10 is to expand and contract with the articles filling the void therebetween due to the forces acting upon the articles such as, water, temperature and age. Also shown are adhesive 42, window 12, and wood trim 26 compressing the gasket 10, and other previously disclosed elements.

Figure 7:
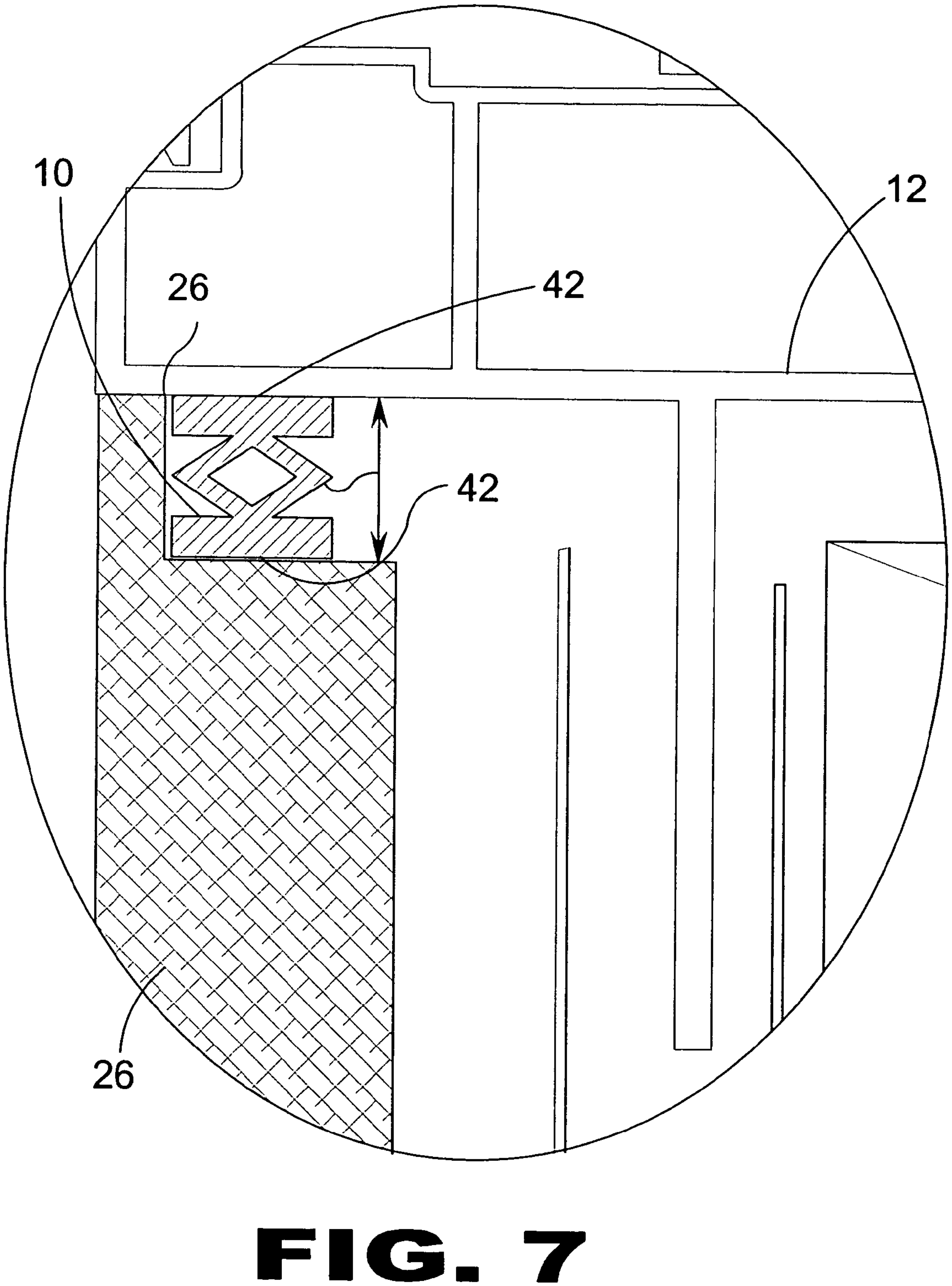
FIG. 7 is a sectional view of a double side expansion joint gasket of the present invention.

Turning to FIG. 7, shown therein is a sectional view of a double side expansion joint gasket of the present invention 10. Illustrated is an expansion joint member of the present invention 10 positioned between adjacent surfaces 12, 26. The elastomeric member 10 will expand and contract, forming an expansion joint gasket between mating articles, comprising a first article engaging element and a second article engaging element spaced from each other having an expandable contractible portion positioned therebetween. The expansion joint gasket is mounted between the articles with adhesive 42 or without adhesively bonding it thereto.

Figure 8:
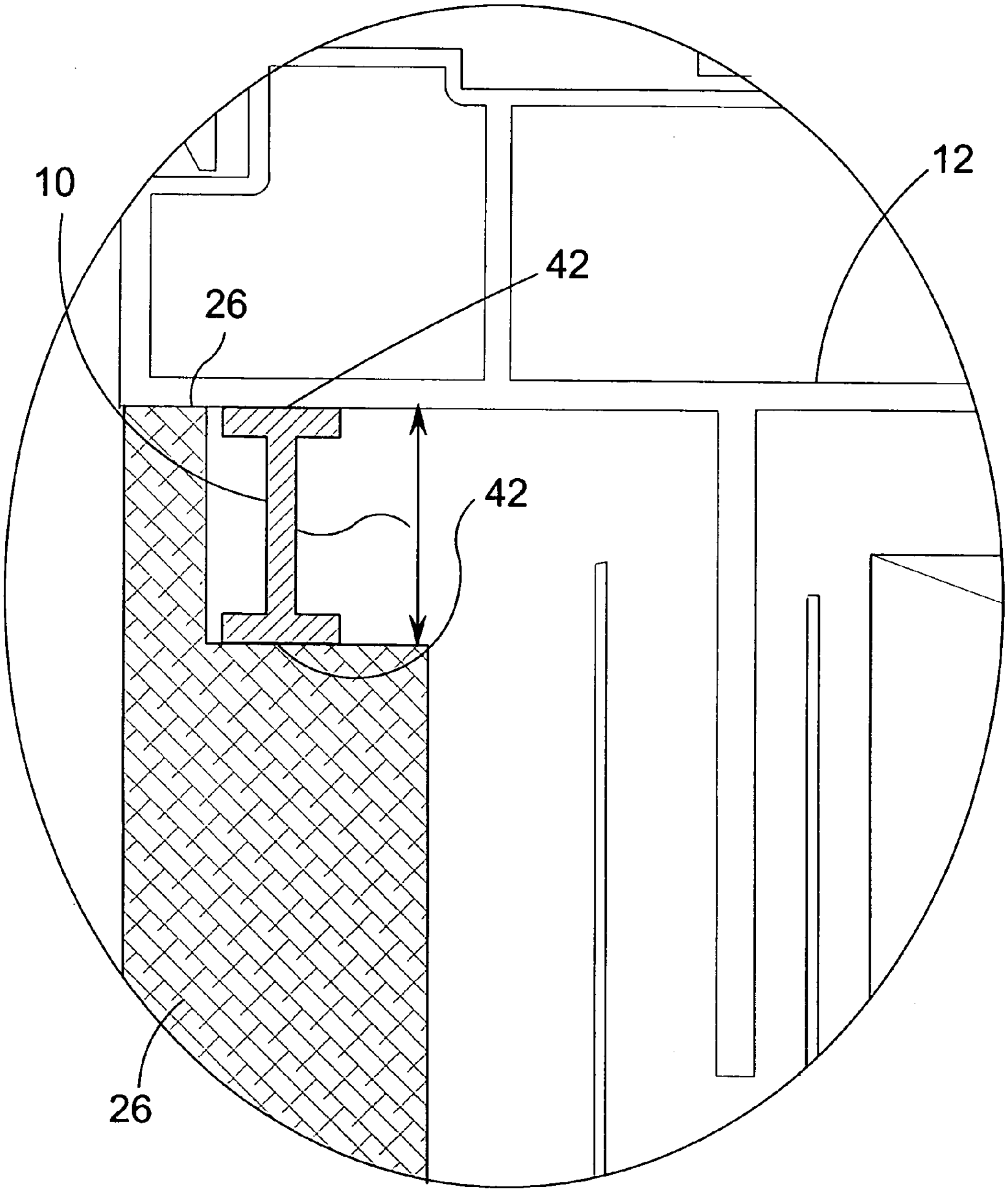
FIG. 8 is a sectional view of another double side expansion joint gasket of the present invention.

Turning to FIG. 8, shown therein is a sectional view of another double side expansion joint gasket of the present invention 10. Illustrated is another expansion joint member of the present invention 10 positioned between adjacent surfaces 12, 26. The elastomeric member will expand and contract, forming an expansion joint gasket between mating articles, comprising a first article engaging element and a second article engaging element spaced from each other having an expandable contractible portion positioned therebetween. The expansion joint gasket is mounted between the articles with adhesive 42 or without adhesively bonding it thereto.

Figure 9:
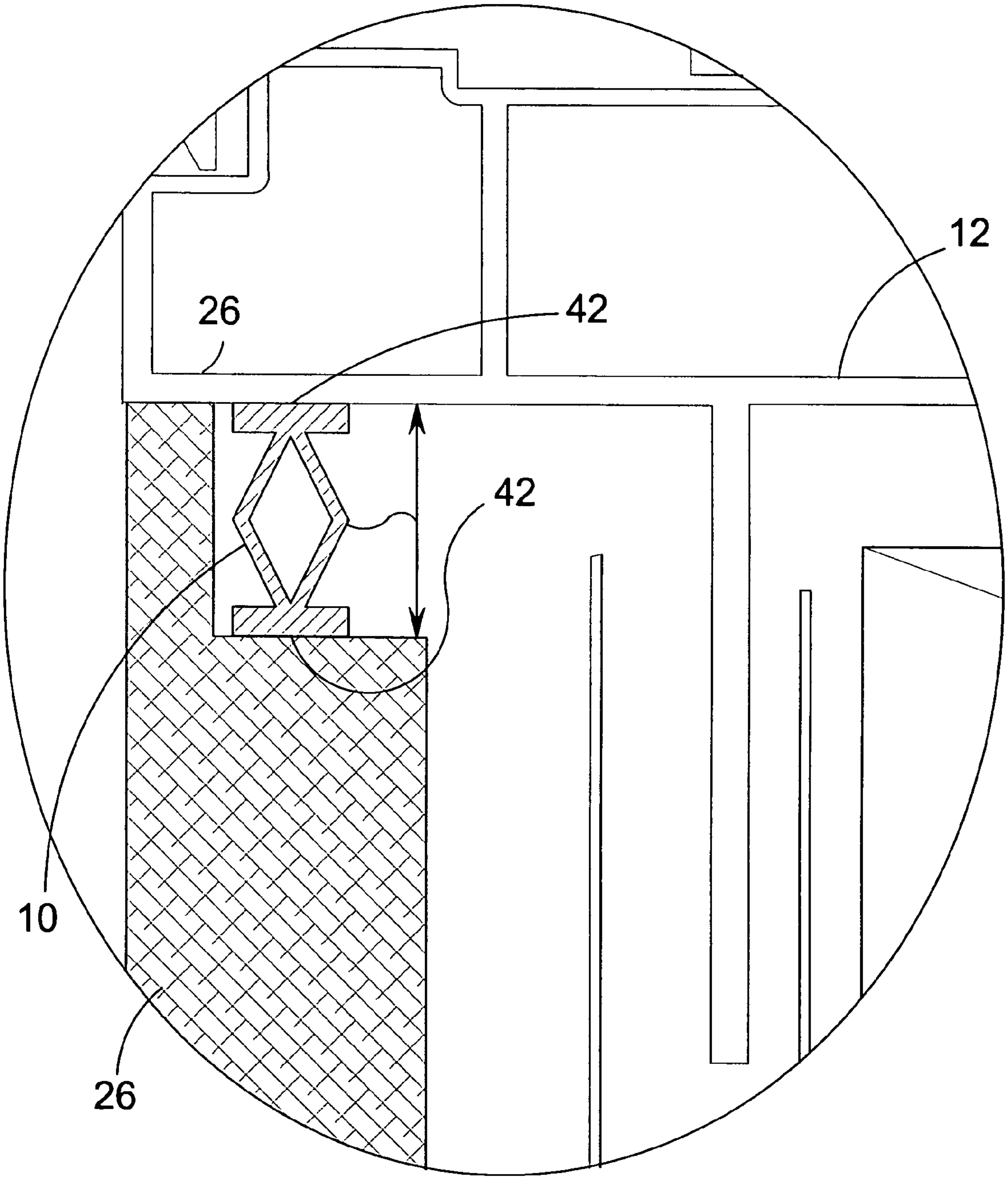
FIG. 9 is a sectional view of another double side expansion joint gasket of the present invention.

Turning to FIG. 9, shown therein is a sectional view of another double side expansion joint gasket of the present invention 10. Illustrated is yet another expansion joint member of the present invention positioned between adjacent surfaces 12, 26. The elastomeric member 10 will expand and contract, forming an expansion joint gasket between mating articles, comprising a first article engaging element and a second article engaging element spaced from each other having an expandable contractible portion positioned therebetween. The expansion joint gasket is mounted between the articles with adhesive 42 or without adhesively bonding it thereto.

Figure 10:
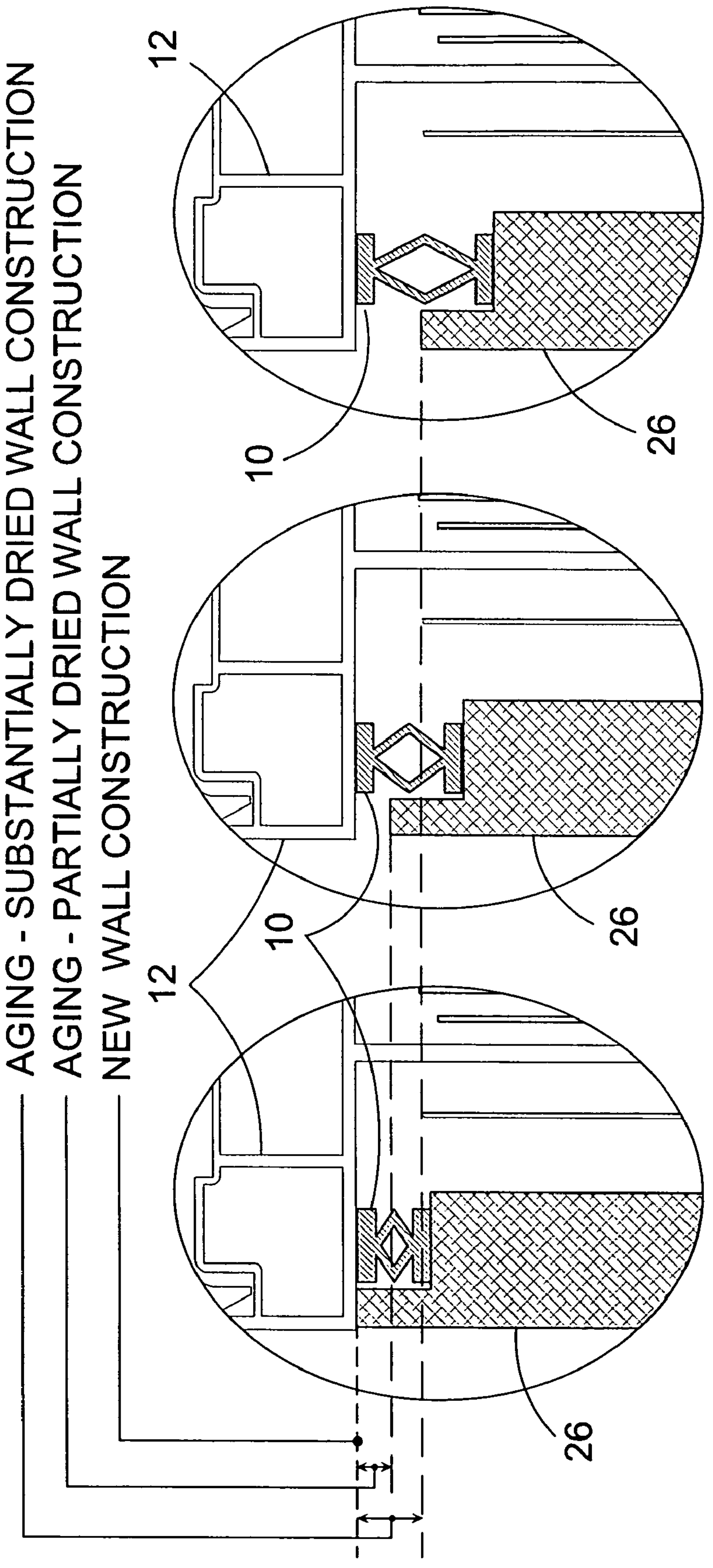
FIG. 10 is sectional views of an aging double side expansion joint gasket of the present invention.

Turning to FIG. 10, shown therein is sectional views of an aging double side expansion joint gasket of the present invention 10. Depicted is a progression over time illustrating new wall construction, partially dried wall construction and substantially dried wall construction with the expansion joint member of the present invention positioned between adjacent surfaces having a gap forming between the adjacent articles 12, 26. The elastomeric member 10 will expand and contract, forming an expansion joint gasket between mating articles, comprising a first article engaging element and a second article engaging element spaced from each other having an expandable contractible portion positioned therebetween. The expansion joint gasket 10 is mounted between the articles with or without adhesively bonding it thereto.

Figure 11:
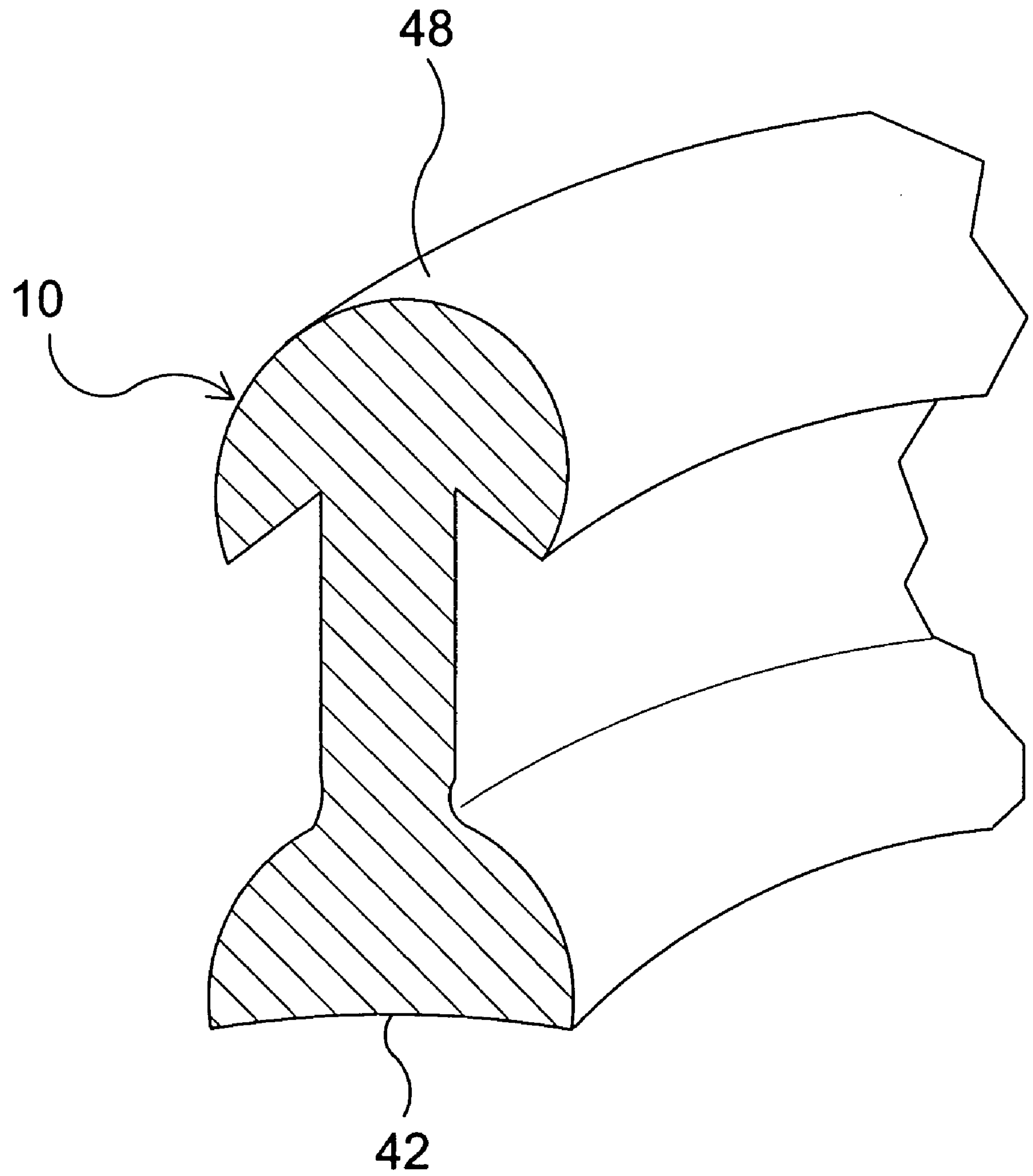
FIG. 11 is a sectional view of an expansion joint gasket of the present invention.

Turning to FIG. 11, shown therein is a sectional view of an expansion joint gasket of the present invention 10. Shown is an expansion joint gasket of the present invention 10 comprising an elastomeric member that will expand and contract when positioned between surfaces of opposing mating articles. The present invention 10 provides for either positioning the gasket between articles with the gasket surfaces engaging opposing article surfaces, whereby the gasket will expand and contract as the void between the articles changes or one element of the gasket is embedded or impressed into a curing substance, such as concrete, plaster, stucco, etc., whereby one end of the elastomeric member becomes anchored into the material as it cures. The function of both variations of the gasket 10 is to expand and contract with the articles filling the void therebetween caused by forces acting upon the articles such as, water, temperature and age. Also shown are an elastomer with rubber-like behavior or closed cell sponge solid extrusion 48 and a high tack adhesive 42 that will adhere to a window frame.

Figure 12:
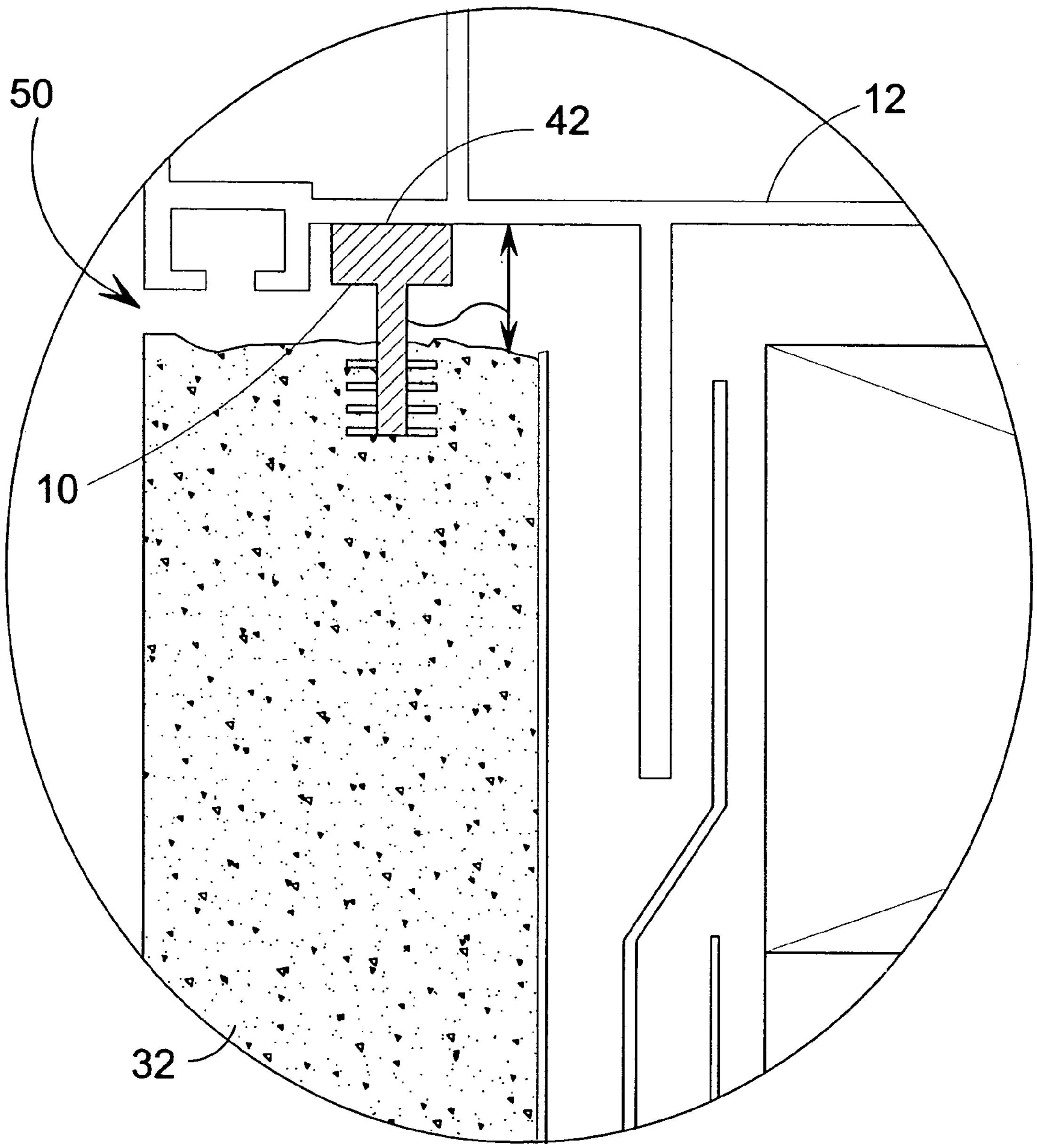
FIG. 12 is a sectional view of a single base side expansion joint gasket of the present invention.

Turning to FIG. 12, shown therein is a sectional view of a single base side expansion joint gasket of the present invention 10. Shown is an expansion joint member of the present invention 10 positioned between adjacent surfaces 12, 32 of substantially dried wall construction 50. The elastomeric member 10 will expand and contract, forming an expansion joint gasket between mating articles, comprising a first article engaging element and a second article engaging element spaced from each other having an expandable contractible portion positioned therebetween. The present invention provides for embedding or impressing part of the elastomeric member into a curing substance, such as concrete, plaster, stucco 32, etc., whereby one end of the elastomeric member becomes anchored into the material as it cures. The other end would engage the opposing article with adhesive 42 or without adhesively bonding it thereto.

Figure 13:
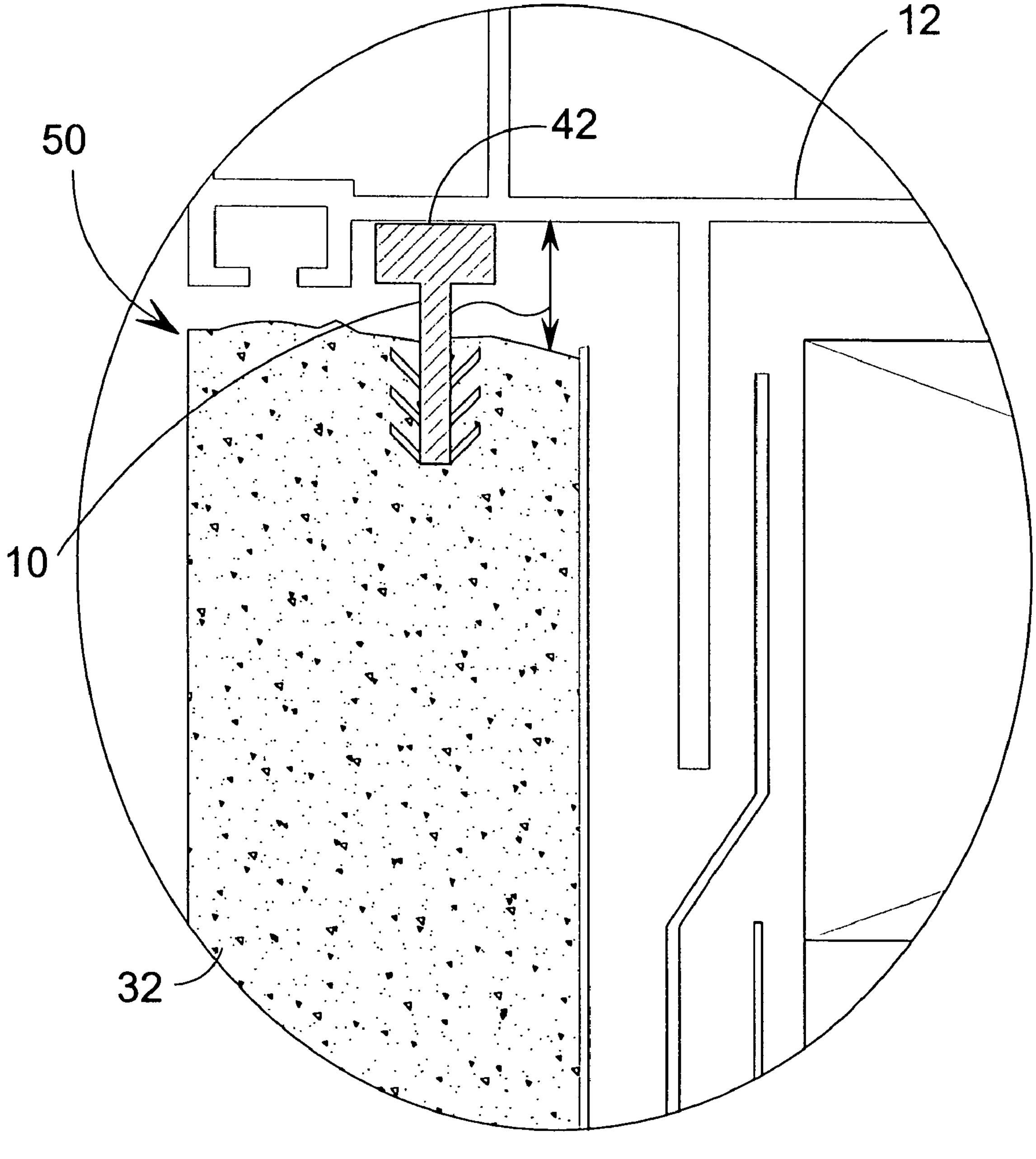
FIG. 13 is a sectional view of a single base side expansion joint gasket of the present invention.

Turning to FIG. 13, shown therein is a sectional view of a single base side expansion joint gasket of the present invention 10. Depicted is another expansion joint member of the present invention positioned between adjacent surfaces 12, 32. The elastomeric member 10 will expand and contract, forming an expansion joint gasket between mating articles, comprising a first article engaging element and a second article engaging element spaced from each other having an expandable contractible portion positioned therebetween. The present invention 10 provides for embedding or impressing part of the elastomeric member into a curing substance, such as concrete, plaster, stucco, etc., whereby one end of the elastomeric member becomes anchored into the material as it cures. The other end would engage the opposing article with adhesive 42 or without adhesively bonding it thereto. Also shown is a substantially dried wall construction 50.

Figure 14:
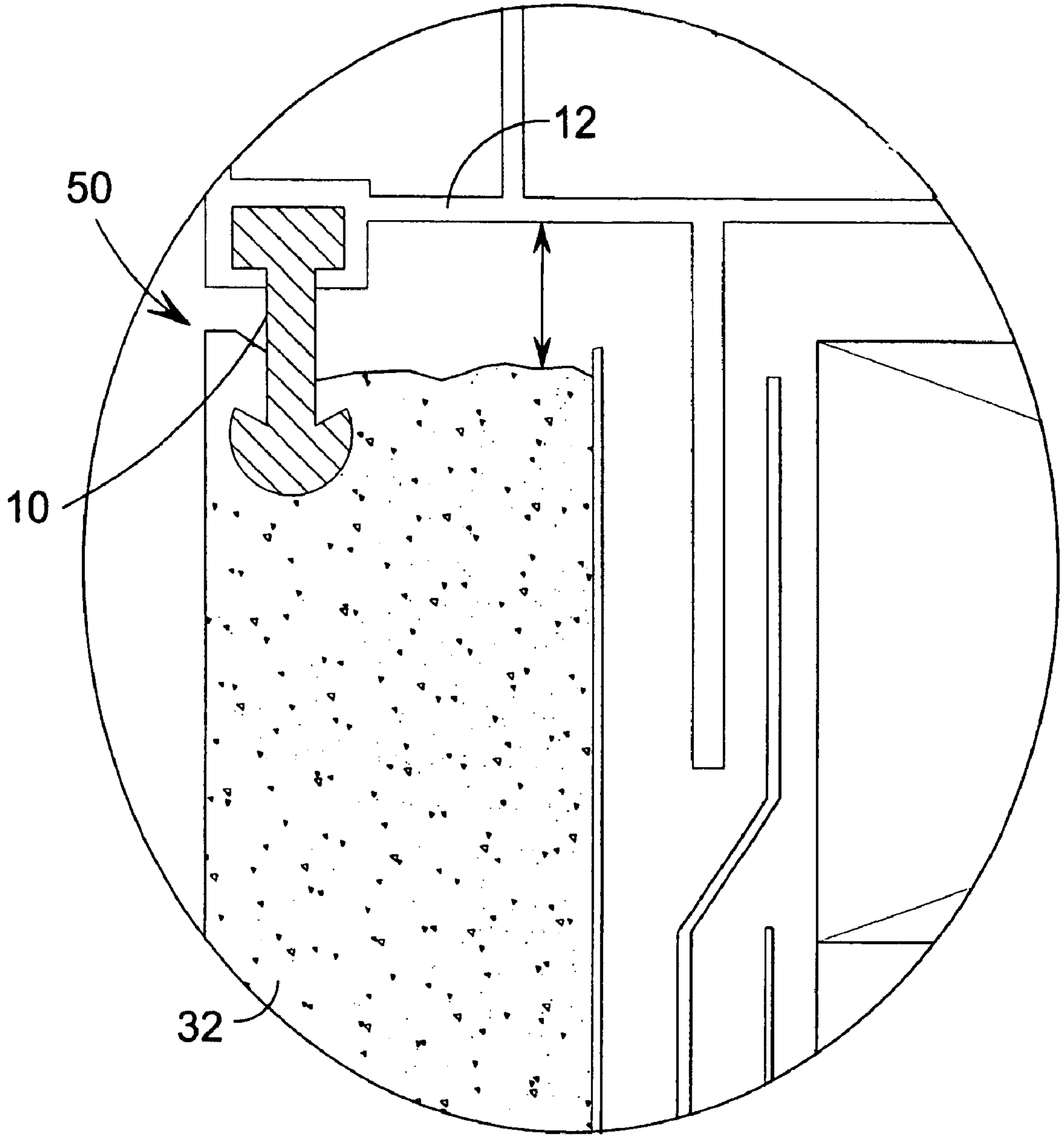
FIG. 14 is a sectional view of a single base side expansion joint gasket of the present invention.

Turning to FIG. 14, shown therein is a sectional view of a single base side expansion joint gasket of the present invention 10. Illustrated is another expansion joint member of the present invention positioned between adjacent surfaces 12, 32. The elastomeric member 10 will expand and contract, forming an expansion joint gasket between mating articles, comprising a first article engaging element and a second article engaging element spaced from each other having an expandable contractible portion positioned therebetween. The present invention 10 provides for embedding or impressing part of the elastomeric member into a curing substance, such as concrete, plaster, stucco, etc., whereby one end of the elastomeric member becomes anchored into the material as it cures. The other end would engage the opposing article with adhesive 42 or without adhesively bonding it thereto. Also shown is a substantially dried wall construction 50. In this installation, the window 12 frame is molded for a pressed fit or any similar design of a window frame designed for pressed or compression fit.

Figure 15:
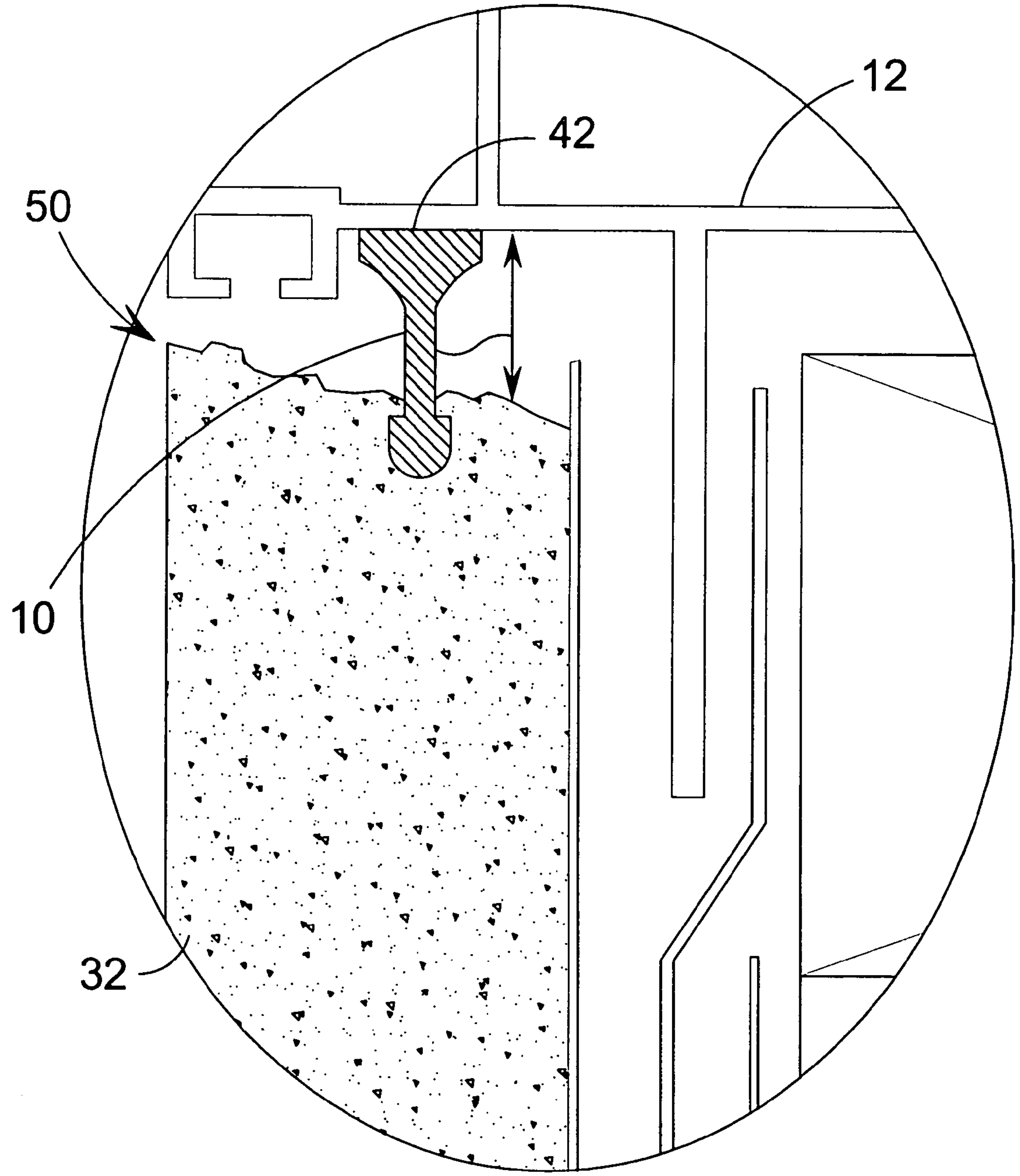
FIG. 15 is a sectional view of a single base side expansion joint gasket of the present invention.

Turning to FIG. 15, shown therein is a sectional view of a single base side expansion joint gasket of the present invention 10. Shown is another expansion joint member of the present invention 10 positioned between adjacent surfaces 12, 32. The elastomeric member 10 will expand and contract, forming an expansion joint gasket between mating articles, comprising a first article engaging element and a second article engaging element spaced from each other having an expandable contractible portion positioned therebetween. The present invention 10 provides for embedding or impressing part of the elastomeric member into a curing substance, such as concrete, plaster, stucco, etc., whereby one end of the elastomeric member becomes anchored into the material as it cures. The other end would engage the opposing article with adhesive 42 or without adhesively bonding it thereto. Also shown is a substantially dried wall construction 50.

Figure 16:
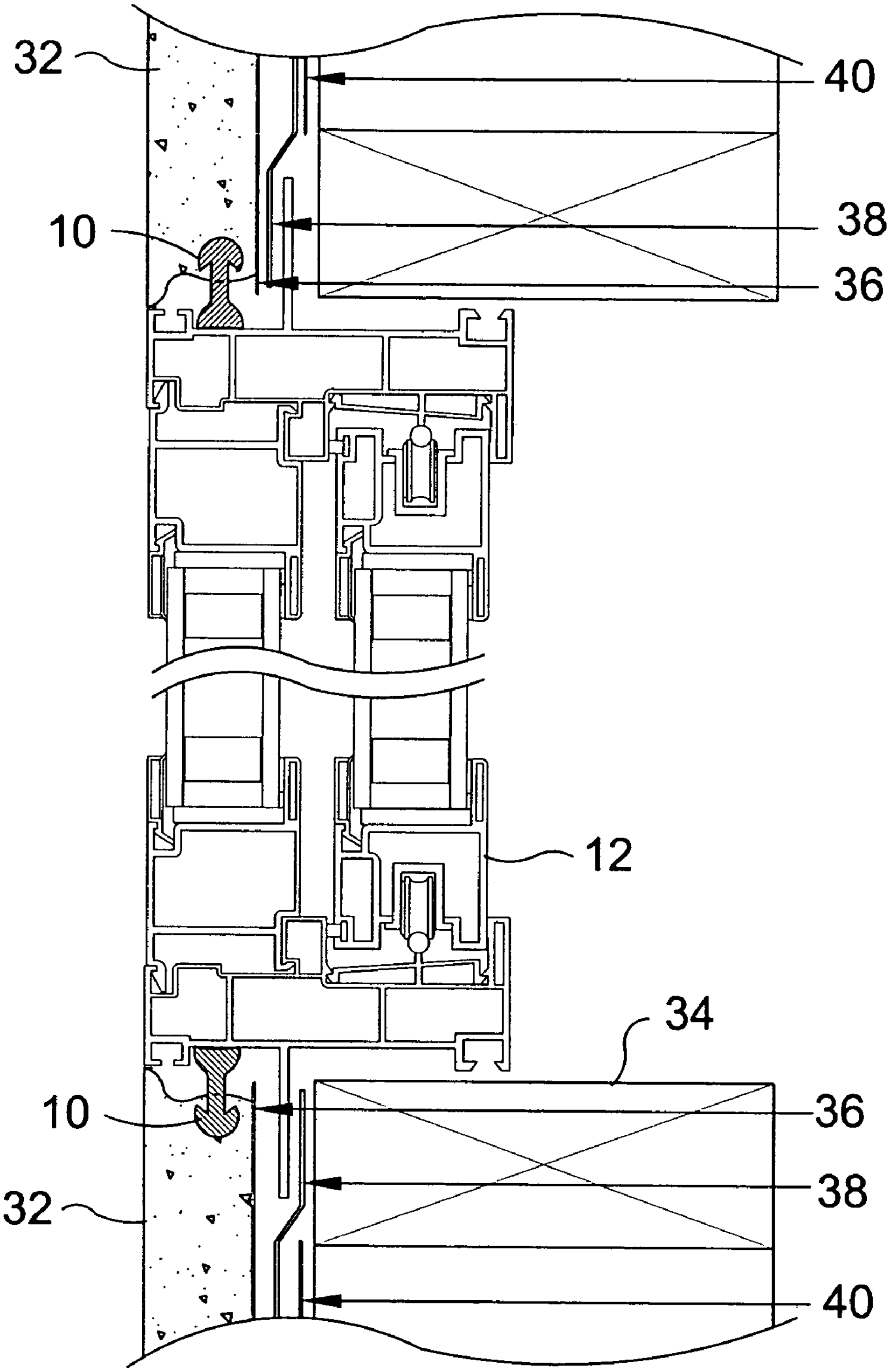
FIG. 16 is a sectional view of the installation of the present invention.

Turning to FIG. 16, shown therein is a sectional view of the installation of the present invention 10. Illustrated is an expansion joint member of the present invention 10 that encompasses an article positioned within an aperture formed in a second article, such as a window 12 placed in a wall. The elastomeric member 10 will expand and contract, forming an expansion joint gasket between the mating articles. The expansion joint 10 is comprised of a first article engaging element and a second article engaging element spaced from each other having an expandable contractible portion positioned therebetween. The present invention 10 provides for embedding or impressing part of the elastomeric member into a curing substance, such as concrete, plaster, stucco 32, etc., whereby one end of the elastomeric member becomes anchored into the material as it cures. The other end would engage the opposing article with or without adhesively bonding it thereto. Other previously disclosed elements are also shown.

Figure 17:
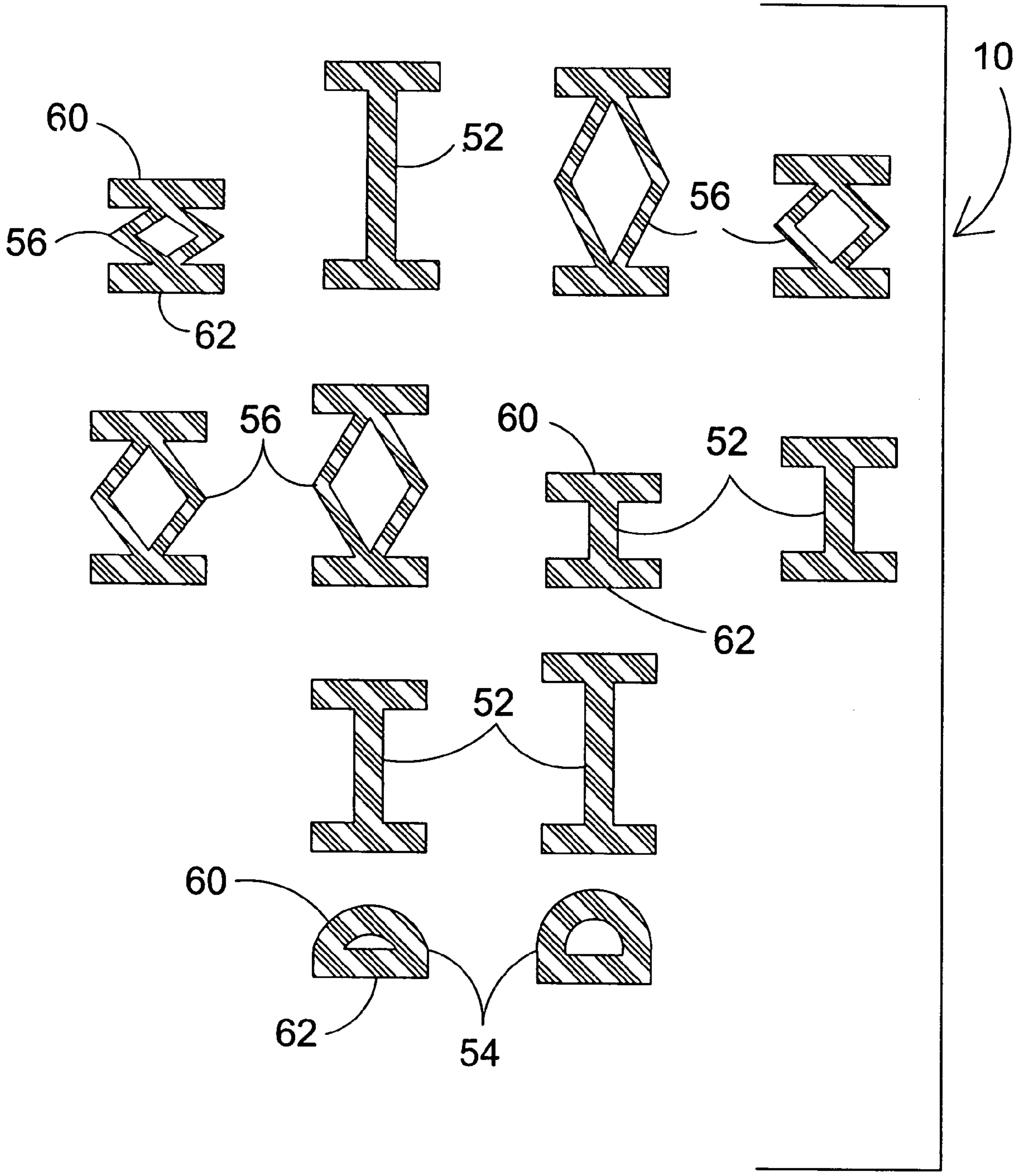
FIG. 17 is a sectional view of double base shaped expansion joint gaskets of the present invention.

Turning to FIG. 17, shown therein is a sectional view of double base 60, 62 shaped expansion joint gaskets of the present invention 10. Illustrated are various examples of the expansion joint gasket of the present invention 10 comprising elastomer extrusions with rubber like behavior for wood siding or around any plaster penetrations including sheet metal products, electrical panels, plumbing, door jambs, foam details, architectural pop outs, wood corbels, etc. Shown are shapes of an I-beam 52, "D" 54, and double legs 56.

Figure 18:
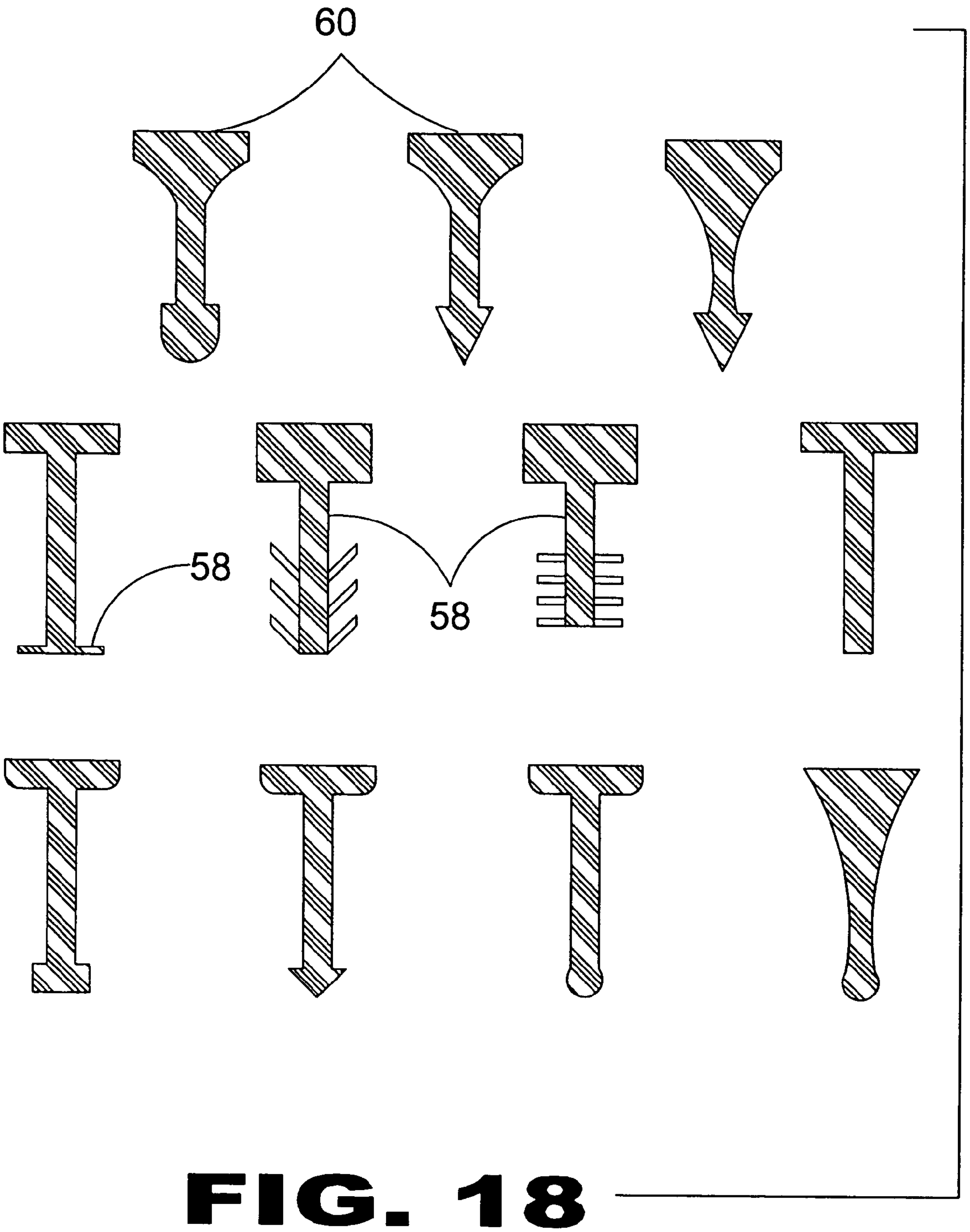
FIG. 18 is a sectional view of single base shaped expansion joint gasket of the present invention.

Turning to FIG. 18, shown therein is a sectional view of single base 60 shaped expansion joint gasket of the present invention 10. Illustrated is one type of variation of the expansion joint member of the present invention 10 comprising a first article engaging element and a second article engaging element spaced from each other having an expandable contractible portion positioned therebetween. One of the article engaging element has single or multiple flanges 58 adjacent the expandable contractible portion that provides means for embedding or impressing part of the elastomeric member into a curing substance, such as concrete, plaster, stucco, etc., whereby one end of the elastomeric member becomes anchored into the material as it cures.

What is claimed to be new and desired to be protected by Letters Patent is set forth in the appended claims.

I claim:

1. An apparatus for providing an expansion joint gasket, comprising:

a) an expansion joint gasket for sealing a void between two mated articles, said gasket having first and second opposing ends connected by a body;

b) wherein said first end forms a base for being contiguous to a first mated article; and, c) wherein said second end forms an arrowhead for being embedded into a second mated article, and further comprising:

d) a receptacle being disposed on the first mated article, said receptacle for receiving said first end of said expansion joint gasket therein.

2. The apparatus of claim 1, wherein said arrowhead forms an enlarged member for being embedded into the second mated article.

3. The apparatus of claim 2, wherein said arrowhead forms a flange member for being embedded into the second mated article.

4. The apparatus of claim 3, wherein said arrowhead forms a plurality of said flange members for being embedded into the second mated article.

5. The apparatus of claim 4, wherein said flanges members are perpendicular to said body.

6. The apparatus of claim 4, wherein said flanges members are angled away from said body.

7. The apparatus of claim 1, wherein said gasket comprises an elastomer.

8. The apparatus of claim 1, wherein said gasket comprises closed cell sponge material.

* * * * *